E. C. DRECOLL.
ADJUSTABLE CRANK.
APPLICATION FILED MAY 1, 1908.
904,764.
Patented Nov. 24, 1908.
2 SHEETS—SHEET 1.
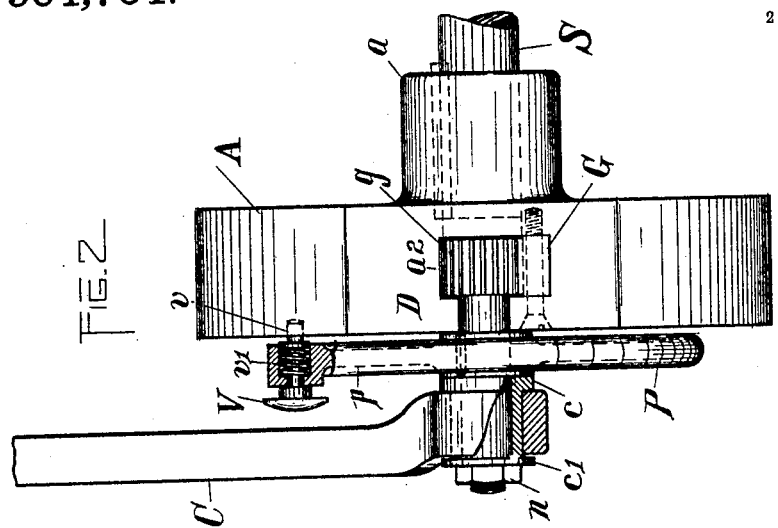
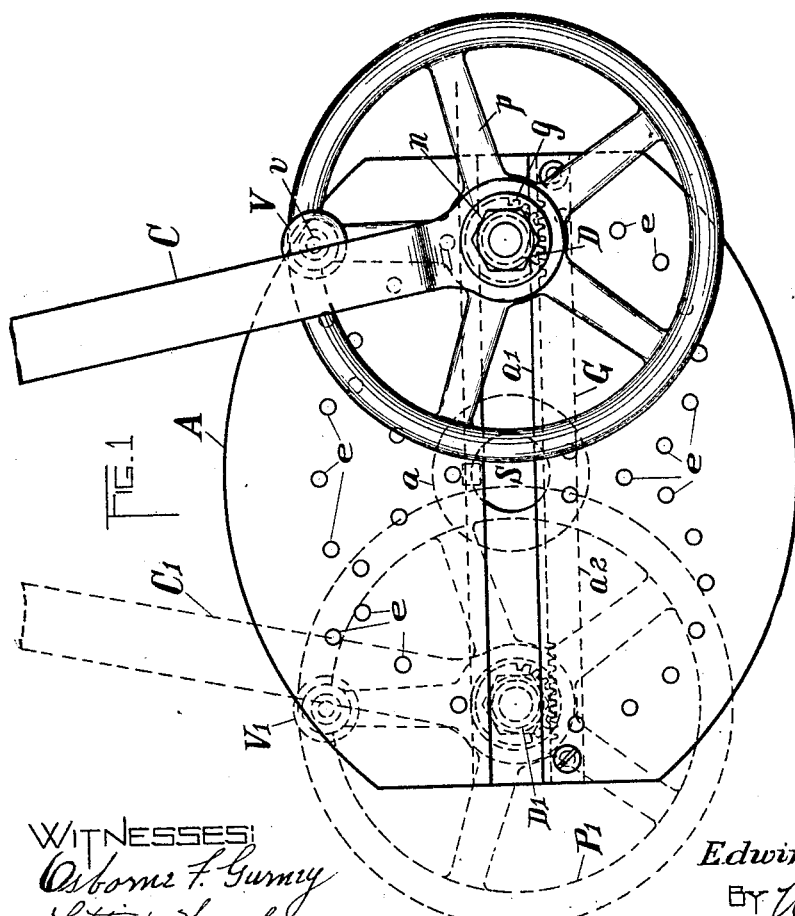
WITNESSES:
Osborne F. Gurney
Lottie Wood
INVENTOR:
Edwin C. Drecoll.
BY W. H. Curley ATTY.

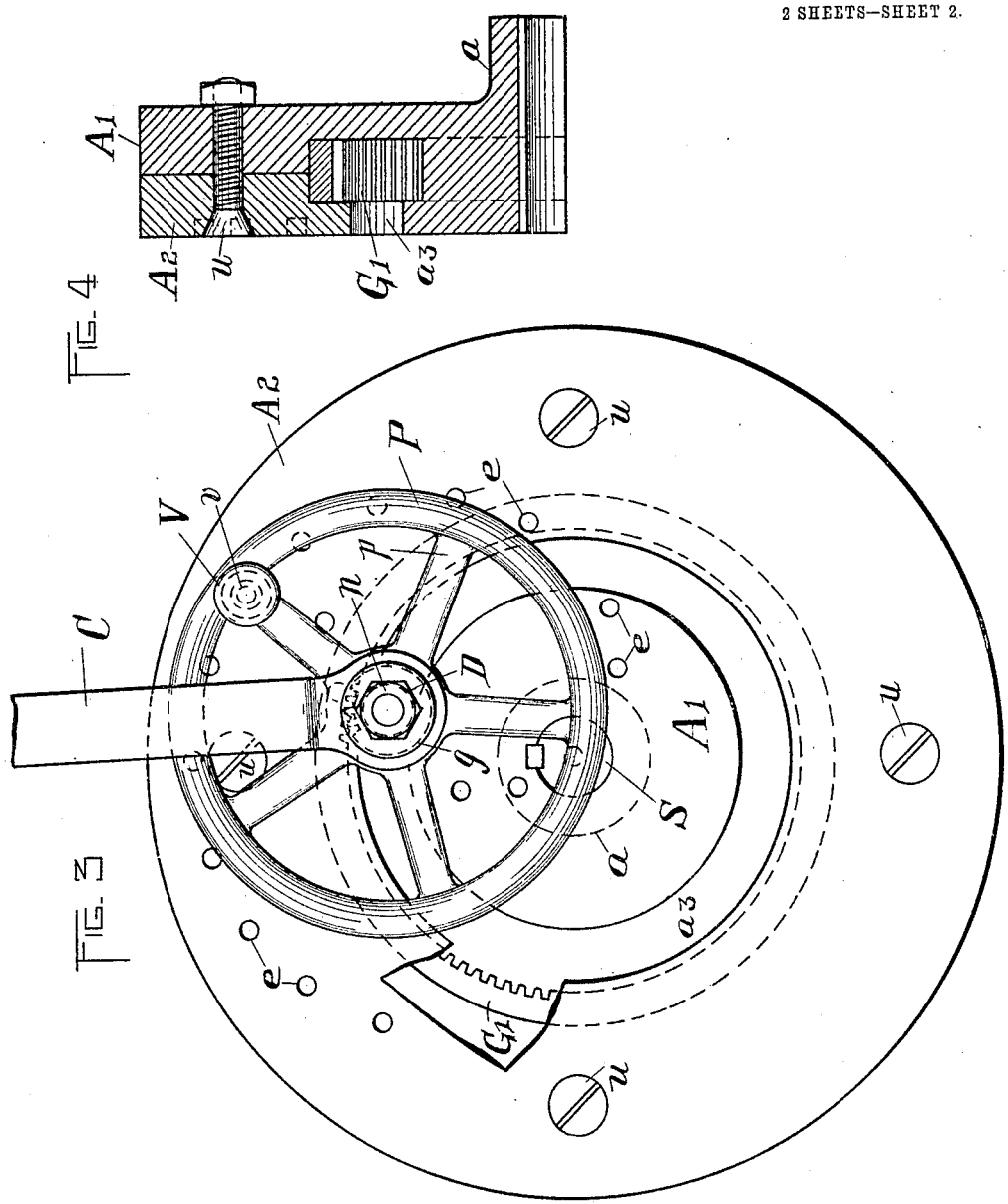

UNITED STATES PATENT OFFICE.

EDWIN C. DRECOLL, OF ROCHESTER, NEW YORK.

ADJUSTABLE CRANK.

No. 904,764.  Specification of Letters Patent.  Patented Nov. 24, 1908.

Application filed May 1, 1908. Serial No. 430,313.

*To all whom it may concern:*

Be it known that I, EDWIN C. DRECOLL, a citizen of the United States, and a resident of Rochester, in the county of Monroe and State of New York, have invented a new and Improved Adjustable Crank, of which the following is a specification.

This invention relates to means for adjusting a crank pin relatively to the shaft on which it is supported. Such adjustment may be an angular one of the crank pin upon the shaft or it may be an adjustment of the eccentricity of the crank pin.

In carrying out my invention, I provide a disk on the driving or driven shaft, as the case may be, with a groove on its face and back of the groove and in alinement therewith and opening thereinto is an enlarged channel, with a rack in one side thereof.

The crank pin proper comprises a stud of a diameter closely fitting the groove and having on the inner end thereof a spur gear wheel adapted to engage the rack and to entirely fill the enlarged channel back of the groove. It is preferable, though not necessary, that the gear wheel be formed integrally with the stud or crank pin, such gear wheel comprising a head on the crank pin adapted to work in the channel and caused to travel therein by the rotation of the crank pin upon its axis.

For rotating the crank pin and gear wheel, I may provide a crank, or preferably an operating wheel rigidly secured to the stud or crank pin and there is also provided means for locking this operating crank or wheel at any desired point in its adjustment.

When an angular adjustment only of the crank is desired, the slot and groove will obviously be circular and concentric with the axis of the shaft. For adjusting the eccentricity of the crank, however, the groove and channel may obviously be straight and extend across the disk or head.

The accompanying drawings illustrating only such latter modification are as follows:

Figure 1 is a face view of the disk and crank pin thereon showing such crank pin in its extreme right hand position in full lines and in its extreme left hand position in dotted lines. Fig. 2 is a side view of the parts seen in Fig. 1 as viewed from the right. Fig. 3 shows a face view of that modification of my invention by means of which an angular adjustment of the crank may be secured, while Fig. 4 shows a partial sectional view of this modification but with the crank pin removed.

Similar letters refer to similar parts in the figures of drawing.

Referring to the drawings,—S is the shaft, rigidly secured upon which is the disk A having a hub $a$ thereon. Extending diametrically across this disk A is seen a groove $a^1$ and a channel $a^2$ opening thereinto and having secured on its lower surface a rack G adapted to be engaged by a spur gear $g$. This spur gear $g$ is rigidly secured upon or formed integrally with the stud D, upon which is rigidly secured the operating crank or wheel P having spokes $p$, and in the periphery of this wheel P is seen the spring locking bolt $v$ having a handle or head V and actuated by the spring $v^1$, in the manner clearly indicated in Fig. 2, whereby the bolt $v$ is forced into and held in that one of the holes $e$ opposite which such bolt $v$ is positioned, except as withdrawn by the hand in engagement with the head V for the purposes of adjustment. C is the connecting rod to be operated from the crank pin D by the rotation of the shaft S with the disk A thereon.

In front of the wheel P, or to the left thereof, as seen in Fig. 2, is a shouldered collar $c$ which may fit quite tightly on the stud D, but should be freely revoluble within the hole therefor in the end of the connecting link C. In front of the collar $c$ is a washer $c^1$ and in front of that a nut $n$ threaded onto the outer end of the stud D. The proportion of the parts is such that when the nut $n$ is firmly screwed up, the head of the connecting link C cannot be clamped between the shoulder on the collar $c$ and the washer $c^1$, while, however, the parts to the left of the left hand face of the disk A, as seen in Fig. 2, are forced to the right upon the stud D, which in turn is drawn to the left, firmly clamping the lips on the disk A on each side of the groove $a^1$ therein between the hub of the wheel P and the gear $g$, thus firmly clamping the stud or crank pin D in any desired position of adjustment.

In adjusting the crank pin D, the nut $n$ is unscrewed sufficiently to release the parts and the spring bolt $v$ withdrawn by means of the handle or head V and the adjusting wheel P is turned until the bolt v is brought opposite the desired one of the holes e in the face of the disk A. The head V is then released and the bolt v engages in such hole e, then upon screwing up the nut n, the parts are rigidly secured in the desired position of adjustment.

In Fig. 1 the extreme right hand positions for the connecting rod C, the stud D, the wheel P and handle V are seen in full lines, while the extreme left hand positions for such parts are seen, respectively, in dotted lines at $C^1$, $D^1$, $P^1$ and $V^1$, from which it will at once be seen that the range of adjustment for my crank pin is nearly the entire length of the groove and channel in the disk A. In Fig. 1 the disk A is shown as having holes e in the face thereof for a succession of different predetermined positions of the stud or crank D, either side of the center of the shaft S.

Refer now to Figs. 3 and 4.—In this modification the disk or head $A^1$ may be circular in form and composed of two parts, the main portion $A^1$ and the washer-like portion $A^2$ secured to the portion $A^1$ by means of screw bolts $u$, as seen, with the circular rack member $G^1$ held in place between them and prevented from rotation by means of any suitable mechanism not shown. When the parts $A^1$ and $A^2$ are secured together, as above described, there is in the completed head thus formed the slot $a^3$ opening into an enlarged channel containing the rack $G^1$. The parts are assembled by first inserting the stud D with the gear $g$ thereon and when the rack $G^1$ is inserted and thereafter the member $A^2$ secured to the main body portion of the disk or head $A^1$, as above described. Exactly the same stud and operating means is made use of in this modification, and in the lettering of such parts, the same system is observed as in Figs. 1 and 2. The rotation of the stud D by means of the handle V on the operating wheel P causes the stud D to travel in the channel $a^3$ and the direction of such travel is determined by but is opposite to the direction of the rotation of the wheel P. Holes e to receive the spring bolt v, as indicated, are provided also in this modification of my invention.

I desire to call attention to the fact that it is immaterial how the disk or head A is constructed to provide the slot and groove therein, that is, whether such head be integral and the slot and groove tooled out therefrom or built up in sections. The conformation of the slot and groove will of course be determined by the character of the desired adjustment. The essential features of my invention then consist in the head or member of whatever conformation carrying the slot and channel and within the channel a rack adapted to coöperate with a gear head on the crank pin and means for rotating the crank pin and gear head thereon and locking the same in any desired position.

What I claim is:—

1. In a device for the purpose described, a shaft having a head thereon; a slot in the face of the head extending and opening into a channel wider than the slot; a rack in such channel; a crank pin comprising a stud having a gear head thereon adapted to engage the rack, the body of the stud extending through the slot and beyond the face of the head to receive a connecting member; means for rotating the stud on its axis to cause the stud to travel in the slot and channel and means for locking the stud in different desired positions of angular adjustment and thereby also correspondingly different distances from the axis of the shaft carrying the head.

2. In a device for the purpose described, a shaft having a head thereon; a slot in the face of the head extending and opening into a channel wider than the slot; a rack in such channel; a crank pin comprising a stud having a gear head thereon adapted to engage the rack, the body of the stud extending through the slot and beyond the face of the head to receive a connecting member; means for rotating the stud on its axis to cause the stud to travel in the slot and channel; means for locking the stud in different desired positions of angular adjustment and thereby also correspondingly different distances from the axis of the shaft carrying the head and means independent of such rotating means for rigidly holding the stud in any position to which it may be carried by such rotating means.

3. In a device for the purpose described, a shaft having a head thereon; a slot in the face of the head extending and opening into a channel wider than the slot; a rack removably secured in such channel; a crank pin comprising a stud having a gear head thereon adapted to engage the rack, the body of the stud extending through the slot and beyond the face of the head to receive a connecting member; means for rotating the stud on its axis to cause the stud to travel in the slot and channel and means for locking the stud in different desired positions of angular adjustment and thereby also correspondingly different distances from the axis of the shaft carrying the head.

4. In a device for the purpose described, a shaft having a head thereon; a slot in the face of the head extending and opening into a channel wider than the slot; a rack in such channel; a crank pin comprising a stud having a gear head thereon adapted to engage the rack, the body of the stud extending through the slot and beyond the face of the head to receive a connecting member; means for rotating the stud on its axis to cause the stud to travel in the slot and channel and means for locking the stud in different desired positions of angular adjustment on its axis and also in correspondingly different positions in the slot.

5. In a device for the purpose described, a shaft having a head thereon; a slot in the face of the head extending and opening into a channel wider than the slot; a rack in such channel; a crank pin comprising a stud having a gear head thereon adapted to engage the rack, the body of the stud extending through the slot and beyond the face of the head to receive a connecting member; means for rotating the stud on its axis to cause the stud to travel in the slot and channel; means for locking the stud in different desired positions of angular adjustment on its axis and also in correspondingly different positions in the slot and means independent of such rotating means for rigidly holding the stud in any position to which it may be carried by such rotating means.

6. In a device for the purpose described, a shaft having a head thereon; a slot in the face of the head extending and opening into a channel wider than the slot; a rack removably secured in such channel; a crank pin comprising a stud having a gear head thereon adapted to engage the rack, the body of the stud extending through the slot and beyond the face of the head to receive a connecting member; means for rotating the stud on its axis to cause the stud to travel in the slot and channel and means for locking the stud in different desired positions of angular adjustment on its axis and also in correspondingly different positions in the slot.

EDWIN C. DRECOLL.

Witnesses:
OSBORNE F. GURNEY,
LOTTIE WOOD.